United States Patent
Geurts

(10) Patent No.: US 12,225,853 B2
(45) Date of Patent: Feb. 18, 2025

(54) HARVESTING DEVICE AND METHOD FOR HARVESTING FRUIT HANGING FROM A PLANT

(71) Applicant: FINE FIELD B.V., Melderslo (NL)

(72) Inventor: Peter Johannes Lodewijk Geurts, Horst (NL)

(73) Assignee: FINE FIELD B.V., Melderslo (NL)

( * ) Notice: Subject to any disclaimer, the term of this patent is extended or adjusted under 35 U.S.C. 154(b) by 759 days.

(21) Appl. No.: 17/425,800

(22) PCT Filed: Jan. 30, 2020

(86) PCT No.: PCT/NL2020/050054
§ 371 (c)(1),
(2) Date: Jul. 26, 2021

(87) PCT Pub. No.: WO2020/159371
PCT Pub. Date: Aug. 6, 2020

(65) Prior Publication Data
US 2022/0330482 A1    Oct. 20, 2022

(30) Foreign Application Priority Data

Jan. 30, 2019  (NL) ...................................... 2022482

(51) Int. Cl.
*A01D 46/22*    (2006.01)
(52) U.S. Cl.
CPC .................................... *A01D 46/22* (2013.01)
(58) Field of Classification Search
CPC ......... A01D 46/22; A01D 46/28; A01D 46/26
See application file for complete search history.

(56) References Cited

U.S. PATENT DOCUMENTS

| 2,435,498 A | 2/1948 | Hapman |
| 3,105,342 A | 10/1963 | Hahn |
| 3,351,151 A | 11/1967 | Miller, Jr. |

(Continued)

FOREIGN PATENT DOCUMENTS

| CN | 110831429 B * | 7/2022 | ........... A01D 46/005 |
| EP | 2462796 A1 * | 6/2012 | ............. A01D 46/28 |

(Continued)

OTHER PUBLICATIONS

International Search Report and Written Opinion for the International Patent Application No. PCT/NL2020/050053, mailed Apr. 24, 2020, 11 pages.

(Continued)

*Primary Examiner* — Arpad Fabian-Kovacs
(74) *Attorney, Agent, or Firm* — KDW Firm PLLC

(57) ABSTRACT

A harvesting device for harvesting fruit hanging from a plant, includes a frame displaceable in a transport direction, at least one container displaceable relative to the frame in a direction of extension substantially transversely of the transport direction; and at least one catcher mounted on the at least one container. The at least one brush includes an arm extending substantially in the direction of extension from the container, and a number of bristles which are attached to the arm and extend substantially parallel to the transport direction. A method for harvesting such fruit, wherein use is made of the harvesting device.

17 Claims, 6 Drawing Sheets

(56) References Cited

U.S. PATENT DOCUMENTS

| | | | |
|---|---|---|---|
| 3,439,482 A * | 4/1969 | Orton | A01D 46/28 56/330 |
| 3,460,332 A | 8/1969 | Buchele | |
| 3,521,438 A * | 7/1970 | Adrian | A01D 46/00 56/330 |
| 3,538,694 A * | 11/1970 | Holloway | A01D 46/28 56/330 |
| 3,553,949 A | 1/1971 | Rauth | |
| 3,601,965 A * | 8/1971 | Kaessbohrer | A01D 46/28 56/329 |
| 3,685,266 A | 8/1972 | Mohn | |
| 3,690,054 A * | 9/1972 | De Carlo | A01D 46/28 56/330 |
| 3,756,002 A | 9/1973 | Mecca | |
| 3,772,866 A * | 11/1973 | Sell | A01D 46/28 56/330 |
| 3,777,463 A | 12/1973 | Claxton | |
| 3,815,343 A * | 6/1974 | Sell | A01D 46/28 56/DIG. 2 |
| 3,822,537 A * | 7/1974 | Sell | A01D 46/28 56/330 |
| 3,901,005 A | 8/1975 | Rohrbach | |
| 4,130,982 A * | 12/1978 | Clary | A01D 46/28 56/330 |
| 4,150,526 A * | 4/1979 | Burton | A01D 46/28 56/330 |
| 4,176,511 A | 12/1979 | Scudder | |
| 4,702,065 A | 10/1987 | Littau | |
| 4,736,574 A | 4/1988 | Walker | |
| 4,890,722 A | 1/1990 | Gough | |
| 4,944,387 A | 7/1990 | Burke | |
| 5,109,657 A * | 5/1992 | DeVries | A01D 46/28 56/330 |
| 5,181,373 A * | 1/1993 | Littau | A01D 46/28 56/330 |
| 5,495,708 A * | 3/1996 | Scott | A01D 46/28 56/330 |
| 6,282,878 B1 | 9/2001 | Hill | |
| 6,421,995 B1 | 7/2002 | Sancho | |
| 6,865,872 B2 * | 3/2005 | Youman | A01D 46/28 56/328.1 |
| 8,117,814 B2 * | 2/2012 | Sidhu | A01D 46/28 56/329 |
| 9,750,188 B2 * | 9/2017 | Takeda | A01D 46/264 |
| 2015/0181807 A1 * | 7/2015 | Driessen | A01D 46/28 56/329 |
| 2017/0231159 A1 | 8/2017 | Williamson | |
| 2019/0208706 A1 * | 7/2019 | Delran | A01D 46/264 |

FOREIGN PATENT DOCUMENTS

| | | | | |
|---|---|---|---|---|
| FR | 2658381 A1 | | 8/1991 | |
| GB | 1588957 A | | 5/1981 | |
| GB | 2281493 A | | 3/1995 | |
| NL | 2009207 C | * | 5/2013 | ........... A01D 46/264 |
| NL | 2022481 B1 | * | 8/2020 | ............ A01D 46/26 |
| WO | 2007021271 A1 | | 2/2007 | |
| WO | 2014012788 A1 | | 1/2014 | |
| WO | WO-2022184861 A1 | * | 9/2022 | ........... A01D 46/264 |

OTHER PUBLICATIONS

International Search Report and Written Opinion for the International Patent Application No. PCT/NL2020/050054, mailed Apr. 29, 2020, 10 pages.

\* cited by examiner

HARVESTING DEVICE AND METHOD FOR HARVESTING FRUIT HANGING FROM A PLANT

This is a national stage application filed under 35 U.S.C. § 371 of pending international application PCT/NL2020/050054, filed Jan. 30, 2020, which claims priority to Netherlands Patent Application No. NL 2022482, filed Jan. 30, 2019, the entirety of which applications are hereby incorporated by reference herein.

The invention relates to a harvesting device for harvesting fruit hanging from a plant, comprising a frame displaceable in a transport direction, at least one container displaceable relative to the frame in a direction of extension substantially transversely of the transport direction, and at least one catcher mounted on the at least one container.

Such a harvesting device is per se known from NL 2 009 207 C and comprises a gantry frame with two containers removed from each other in the direction of extension and having on each thereof a number of bristles directed toward the other container. During use the harvesting device of NL 2 009 207 C travels over a row of plants in the transport direction, after which the two containers are placed toward each other. The brushes directed toward each other thereby form a catching surface for fruit, which can be shaken off the plant. The fruit can also be picked off the plant and then immediately released, whereby it will still fall in the vicinity of the plant.

It is mainly when the known harvesting device is not correctly aligned relative to the plant from which the fruit is to be harvested, i.e. when the plant is not positioned precisely halfway between the containers, which occurs frequently because plants are not positioned precisely in a straight line, that the bristles directed toward each other do not enclose the plant properly. This is because, when the distance from a container to a plant is relatively small, the bristles are bent around the plant, which creates a hole behind the plant which is not covered by the bristles. Fruit can fall through that hole during harvesting. The fallen fruit is deemed lost. A percentage of the fruit in the multiple tens is sometimes lost with such a harvesting device.

The invention has for its object to provide an improved harvesting device, whereby less fruit is lost.

This object is achieved with a harvesting device of the type stated in the preamble, wherein the at least one catcher comprises an arm extending substantially in the direction of extension from the container, and at least one flexible catching element attached to the arm and extending substantially parallel to the transport direction from the arm.

Because the catching element extends parallel to the transport direction according to the invention, the distance of the plant to the container is less relevant. The catching element can after all be attached to the arm at any distance from the container and extend parallel to the transport direction in order to be able to enclose the plant and catch fruit. The harvesting device according to the invention forms thereby a catching surface of catching elements which has smaller holes than the known harvesting device, or even no holes, so that less fruit falls between the catchers.

Owing to the arm with catching elements in the transport direction, such a harvesting device is particularly suitable for harvesting fruit which grows on bushes. This is because bushes consist of a number of branches extending upward from the ground, instead of a single trunk. In order to catch as much fruit as possible, each branch must be enclosed by the catching surface. This is particularly well possible with the harvesting device according to the invention, because the arm can be extended between the branches of a bush, wherein the catching elements extend alongside the branches. The arm therefore has in particular an elongate form, so that the arm can be extended between branches of plants. The flexible catching element can provide the advantage that the fruit is not damaged by falling, because the flexibility of the catching element provides the fruit with a soft landing.

The catcher can further comprise a catching bin for catching and collecting harvested fruit. The arm can be mounted on the catching bin and extend from the catching bin. A clear distinction must be made between the arm and the catching bin, because the arm can be extended between branches owing to its elongate form, and the bin cannot be, or less easily so. It is of course possible for fruit to be caught directly by the collecting bin, but it is precisely the arm which can be extended between the branches in order to thus catch fruit, and for instance guide it to the collecting bin, that is particularly advantageous.

The at least one flexible catching element is particularly formed by a flexible strip, which is preferably manufactured from optionally synthetic rubber. The strip can be arranged in a longitudinal direction of the arm and extend from the arm. By using a flexible strip plants, particularly bushes, can be enclosed relatively well without causing very large holes. A larger proportion of the fruit is thereby caught.

Alternatively, the at least one flexible catching element is formed by a number of bristles, which are attached to the arm and extend substantially parallel to the transport direction. The number of bristles can enclose a plant, particularly a bush, particularly well and thus catch a large proportion of or even all the fruit.

A first flexible catching element particularly extends from the arm substantially in the transport direction, and a second flexible catching element extends substantially counter to the transport direction. This can for instance be achieved by attaching catching elements to the arm in their centre, so that the free ends of this catching element extend away from the arm in two directions. Alternatively, separate catching elements can be used for the first catching element and the second catching element.

The first and the second catching element effectively make the catcher two-sided. When the arm is extended between branches of a bush, the catching elements can enclose branches on both sides of the arm and here prevent or reduce holes in the catching surface, and thus catch fruit. Fewer or no holes thereby result in the catching surface which is formed by the catchers. Owing to the catching elements on two sides, the catcher can further cover a relatively large surface area without long catching elements, as seen in the transport direction, being necessary for this purpose. This provides the advantage that the catching elements, when a part thereof is bent by a plant, will leave no or only a relatively small hole uncovered behind and/or next to the plant, so that no or less fruit is lost. Alternatively or additionally, short catching elements provide the advantage that, in order to prevent bending due to the force of gravity, they need not take as stiff a form as catching elements of the known harvesting device, which are after all longer. Such less stiff catching elements reduce the chance of a plant being damaged by the catching elements during harvesting.

The first flexible catching element is preferably attached relative to the second flexible catching element at a non-straight angle in a plane at right angles to a longitudinal direction of the arm. The catching elements hereby form a V-shape as seen in a cross-section of the arm, wherein the arm lies in the point of the V, and the respective first and second catching element each form a leg of the V.

Owing to its V-shape, the catcher forms a gutter in which fruit which is shaken or picked off the plants and dropped can be guided in the longitudinal direction of the arm. The flexible catching elements preferably extend for this purpose from the arm in a direction defined as upward in normal use of the harvesting device. The arm is thereby situated close to the underside of the gutter formed by the catching elements. Harvested fruit will thus roll toward the arm in the gutter. Because the catching elements are attached to the arm, it is precisely close to the arm that the gutter is sufficiently strong to guide the harvested fruit, whereby no or little fruit will fall between the catching elements. In this way the fruit is also guided away from the free ends of the catching elements, which at least partially prevents fruit from falling off the catcher.

When a plurality of arms are arranged adjacently of each other, for instance two or more on the same container and/or in the case of a plurality of containers adjacently of each other, a free end of the first flexible catching element of a determined arm preferably at least almost touches a free end of the second flexible catching element of an adjacent arm. Owing to the two mutually adjacent arms, this results in a combined catching surface which leaves no or only small holes uncovered. A larger proportion of the fruit can hereby be caught.

It is also possible to envisage mutually adjacent catchers at least partially overlapping each other. This results in relatively small holes around plants during the harvesting, whereby less fruit is lost.

The arms otherwise also extend from the container in the direction defined as upward, so that harvested fruit rolls in the longitudinal direction of the arm toward the containers. The fruit can there be caught in catching bins arranged for this purpose.

When the catcher has bristles, these bristles are preferably connected to the arm at an acute angle, wherein the acute angle is defined between the arm and the bristles attached thereto, on a side of the bristles directed toward the container. In other words, the bristles point back slightly toward the container. The arm can hereby be moved easily alongside a plant, or between branches of a bush, in the direction of extension because the displacement of the plant relative to the container in that case takes place with the direction of the bristles.

The arm is preferably flexible. This is because the arm can thereby bend when a plant or branch is located at the position of the arm. If hereby becomes possible to displace the container in the direction of extension in order to catch fruit, even when the harvesting device is aligned relative to plant such that a plant is located at the position of an arm. The arm will then after all bend in order to make space for the plant or branch.

In order to obtain the desired flexibility of the arm it can be manufactured from a plastic. This is otherwise also the case for the catching elements, e.g. the bristles or the strip, which generally also take a flexible form. The flexible bristles provide for a damping and/or resilient effect when fruit falls onto the bristles. The bristles thereby at least partially prevent the fruit from becoming damaged by falling.

In a practical embodiment of the harvesting device it is provided with at least two containers removed from each other in the direction of extension, wherein the arms of the catchers of the two containers removed from each other in the direction of extension are directed toward each other. A harvesting zone is created between the two containers removed from each other in the direction of extension. A harvesting device with such a harvesting zone can then travel over a plant which is located in the harvesting zone at that moment, whereby a container is situated on two sides of the plant. The arms of the two containers are then directed toward the plant. It is hereby particularly easy to provide an at least substantially continuous catching surface of catchers all around the whole plant and thus ensure that little or no fruit falls onto the ground.

It is particularly advantageous for a minimal distance to be defined between the at least two displaceable containers in the direction of extension, wherein each arm bridges about half of this minimal distance in the direction of extension. Because each arm bridges about half of the minimal distance, the free ends of the arms directed toward each other at least almost touch each other. A combined, at least substantially continuous catching surface is hereby formed by the catchers of the arms lying opposite each other. This once again provides for a limitation or prevention of the loss of fruit.

It is advantageous for the arms of the catchers of the two containers removed from each other in the direction of extension to be offset relative to each other as seen in the transport direction, because the catchers of the containers removed from each other in the direction of extension in this way connect relatively closely to each other. This contributes to the continuous catching surface, and thus to reducing the loss of fruit. It will be apparent that, when the arms are offset relative to each other in this way, the free ends of the arms will not touch each other. The free ends of the catchers formed by these arms however do still touch each other at least almost, whereby the catching surface still remains at least substantially continuous.

The invention also relates to a method for harvesting fruit hanging from a plant, comprising the steps of displacing a harvesting device as described above toward at least one plant in a transport direction, displacing the at least one container toward the at least one plant in the direction of extension such that the at least one flexible catching element forms a catching surface at least partially around the at least one plant, shaking the at least one plant so that the fruit hanging therefrom falls onto the catching surface, or picking and dropping fruit, and collecting the fruit caught by the catching surface.

According to the invention, the method can be performed with a harvesting device as described above, with any of the above stated features. The method can thereby provide the advantages stated therewith. The method according to the invention particularly provides an efficient way of harvesting, since no or little fruit is lost by falling onto the ground.

When the method is performed with the harvesting device which is provided with at least two containers removed from each other in the direction of extension, wherein the arms of the catchers of the two containers removed from each other in the direction of extension are directed toward each other, the at least two containers can be displaced toward the plant from opposite sides of the plant. The plant can thus be enclosed on all sides by the catchers.

The invention will be further elucidated with reference to figures, wherein.

The same elements are designated in the figures with the same reference numerals. Similar elements in a determined embodiment are designated in each case with reference numerals increased by a hundred (100) relative to a previous embodiment.

Figure 1:
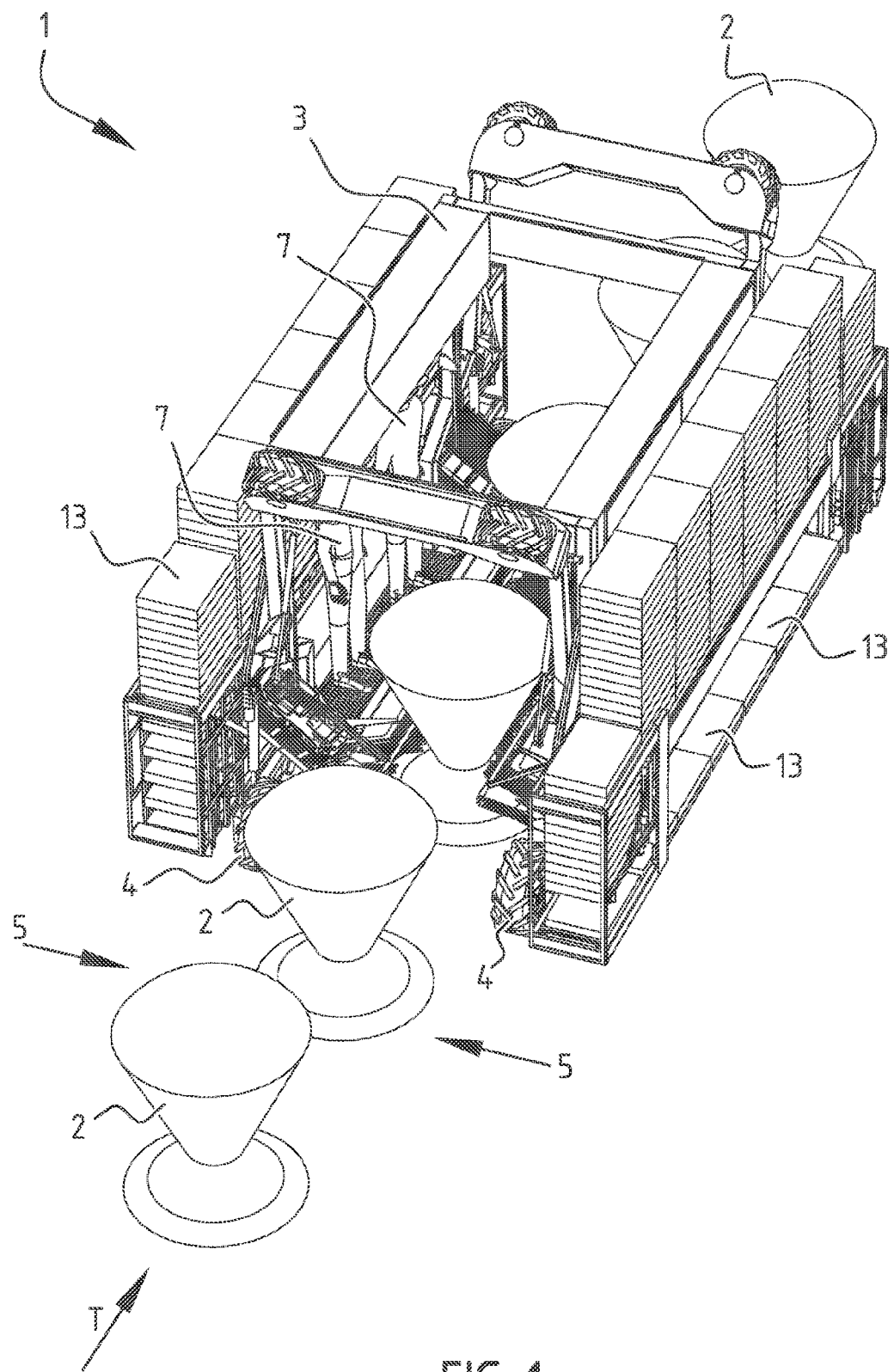
FIG. 1 shows schematically a perspective top view of an embodiment of the harvesting device according to the invention while it is being displaced along a row of plants.
Figure 2:
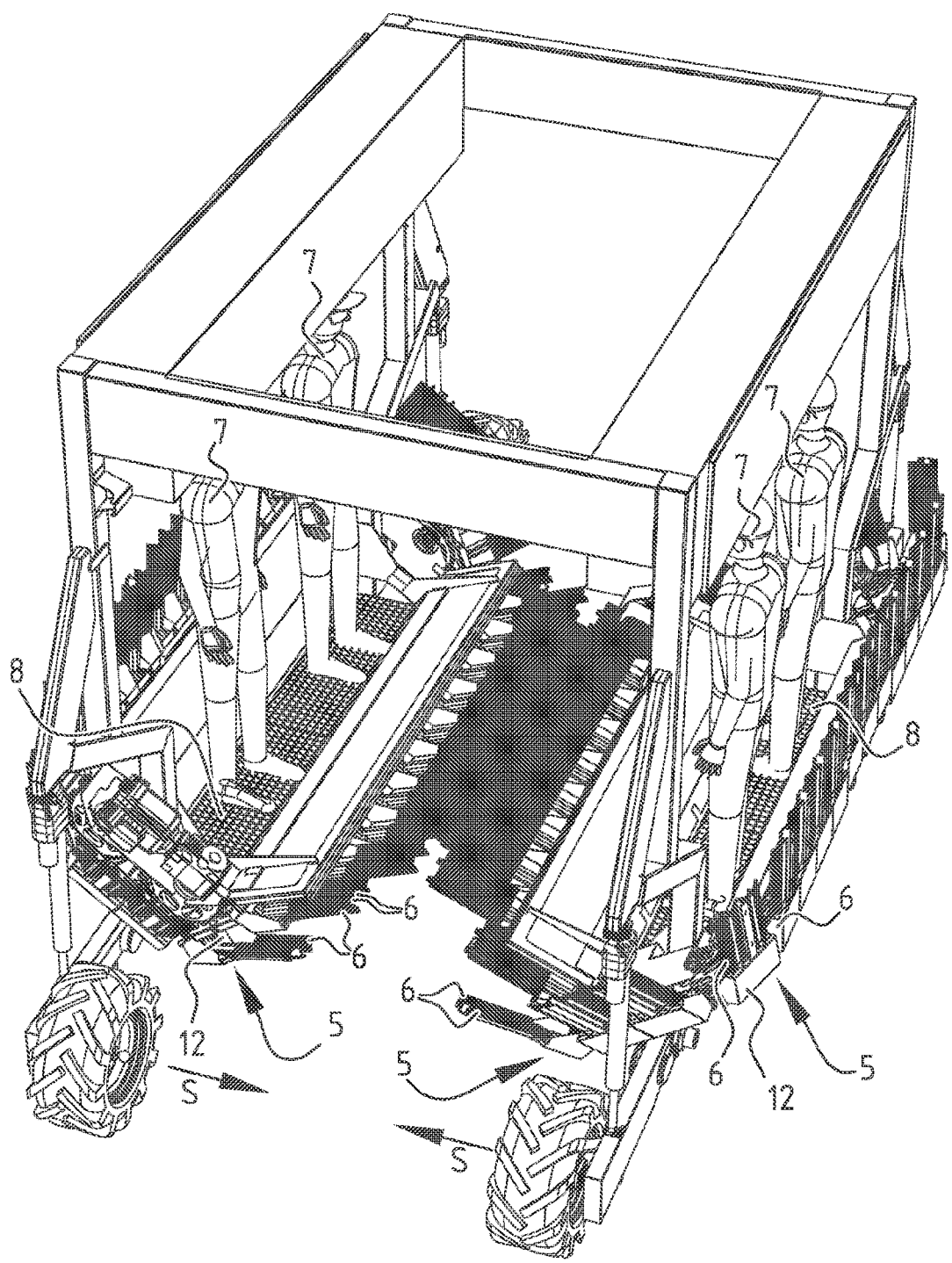
FIG. 2 shows schematically a perspective view of the harvesting device of FIG. 1, wherein a number of elements have been omitted for the sake of clarity.

FIGS. 1 and 2 show a harvesting device 1 which is used for harvesting fruit hanging from a plant 2. In this case plants 2 are shown greatly simplified. Plants 2 can for instance be bushes 2, which consist of a plurality of branches extending upward from the ground. Plants 2 are generally in a row so as to facilitate the harvesting, but are not always precisely in a straight line. The deviation of plants 2 relative to a precisely straight line comes about randomly during planting and/or growing of plants 2 and impedes harvesting, as will be further elucidated below. Hanging from plants 2 is fruit (not shown) which comes off plant 2 when the plant 2 is shaken. The fruit can of course also be picked and released. The fruit then falls onto the ground, unless it is caught. Fruit which falls on the ground is deemed lost, thus making it important to catch as much fruit as possible in order to be able to use as much of the harvest as possible.

In order to harvest fruit from such plants 2 a harvesting device 1 is provided, which has a frame 3 which is displaceable in a transport direction T. Transport direction T is the same as the longitudinal direction of the row in which plants 2 are arranged. In this embodiment frame 3 can travel in that it is provided with wheels 4. In order to be able to approach plants 2 from two sides frame 3 is formed as a gantry which can be displaced over the row of plants 2. The gantry comprises two frame halves 14A, 14B connected on their upper side by a bridge piece 15. During harvesting the harvesting device 1 is thus displaced over the row of plants in the longitudinal direction of the row of plants 2, i.e. in the transport direction T.

Figure 6:
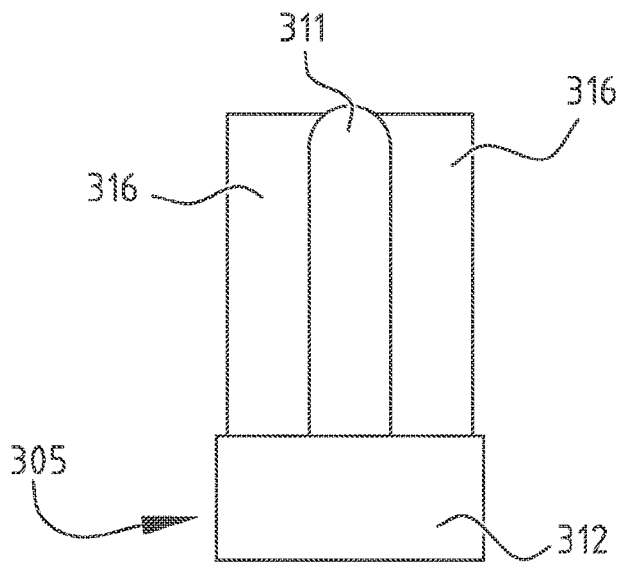
FIG. 6 shows schematically a top view of a container according to another embodiment, which comprises a flexible strip.

The shown harvesting device has a plurality of containers 5 on which catchers 6 are mounted. In this embodiment the catchers 6 are brushes 6. Referring to FIG. 6, it is explained below that catchers 6 can also have a flexible strip instead of brushes with bristles. Containers 5 are displaceable relative to frame 3 in a direction of extension S, and so therefore are the brushes 6 mounted on containers 5. The direction of extension S is defined transversely of the transport direction T, as seen in the horizontal plane. For each container 5 the direction of extension is defined from the relevant frame half 14A, 14B to the opposite respective frame half 14A, 14B, and so toward a plant 2, at least if a plant 2 is present under the frame 3 at that container 5. In the shown embodiment harvesting device 1 has a plurality of containers 5 on either side of frame 3, which are removed from each other in the direction of extension S. During use plants 2 move relative to the frame, between the containers 5 which are removed from each other in the direction of extension S.

In this case plants 2 are shaken when they are located at containers 5. The shown embodiment shows workers 7 who shake plants 2 manually. Workers 7 could also pick fruit and then drop it. Harvesting device 1 has a standing surface 8 for workers 7. Such a harvesting device is also referred to as 'semi-mechanical' due to the manual rather than mechanical shaking of plants 2 by workers 7. It is however also possible to envisage providing mechanical shaking means, so that workers 7 are not needed.

The brushes 6 mounted on containers 5 form an almost closed catching surface which closes all around a stem of a plant 2 by displacement of containers 5 in the direction of extension. This will be further elucidated with reference to FIGS. 3 and 4.

Figure 3:
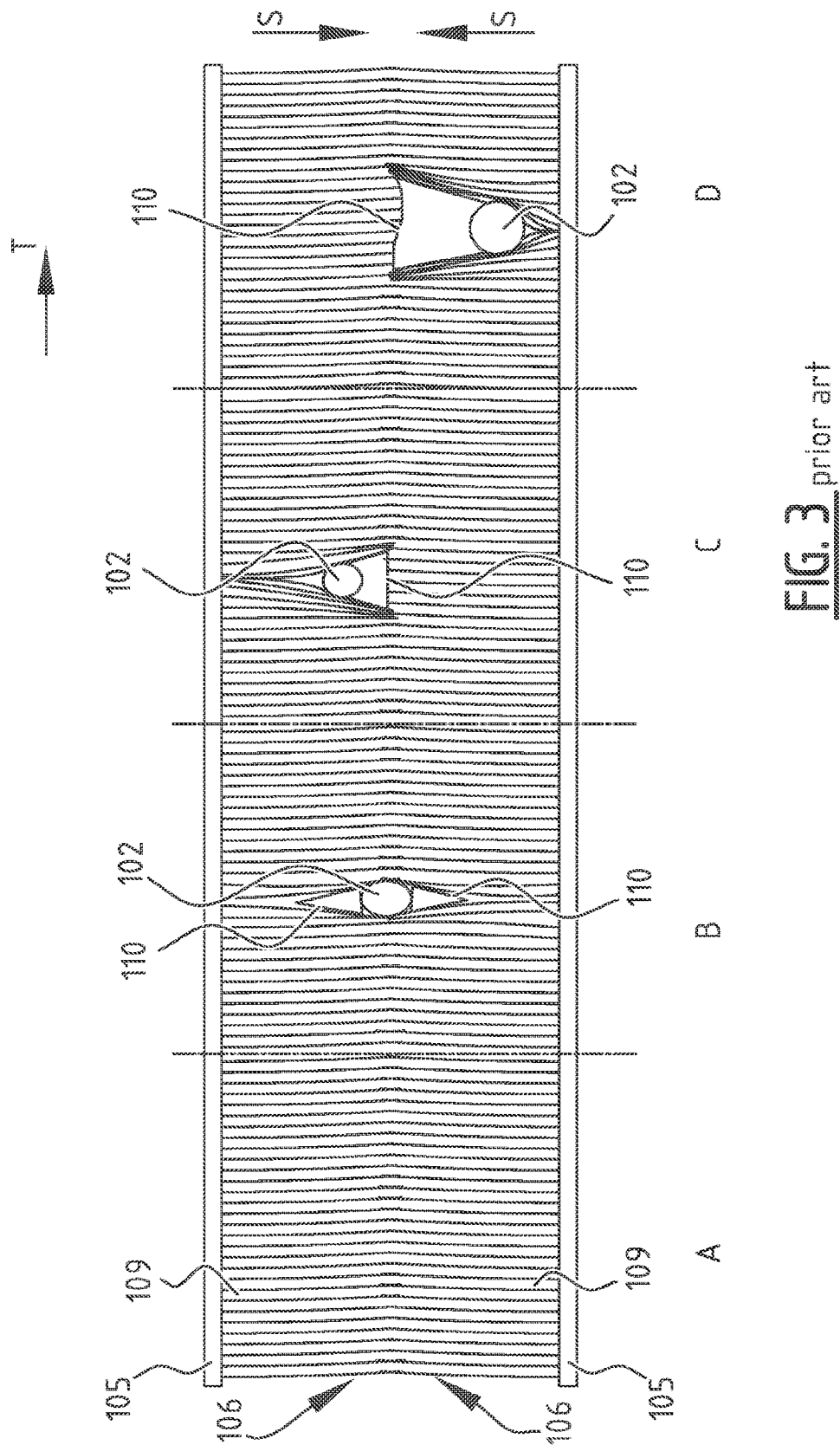
FIG. 3 shows schematically a top view of two containers and two brushes according to the prior art.

FIG. 3 shows two containers 105 with brushes 106 as are known from the prior art according to NL 2 009 207 C. Brushes 106 consist here of bristles 109 extending from container 105. Containers 105 run parallel to the transport direction T; bristles 106 therefore run parallel to the direction of extension S. In FIG. 3 containers 105 are shown in a position in which they are shifted toward each other. In order to displace harvesting device 1 it is known to move the containers 105 of FIG. 3 apart, i.e. counter to the direction of extension S, whereby space is created between the brushes. Harvesting device 1 is then displaced in transport direction T to a new plant 2 from which the fruit has to be harvested, after which containers 105 are shifted toward each other, i.e. displaced toward each other in direction of extension S. Bristles 109 then extend alongside the plant 2.

In a first part of FIG. 3, designated with A, no plant is situated between containers 105. Brushes 106 therefore connect to each other and form a continuous catching surface. In the part designated with B a stem or branch of a plant 102 is shown, which is situated precisely halfway between containers 105. For the harvesting device 1 with prior art brushes 106 this is ideal, because bristles 109 of brushes 106 are bent by plant 102 only at their free ends. Nevertheless, the problem arises in such brushes 106 of a hole 110 in the catching surface formed by brushes 106, which hole 110 is always shown outlined in this figure, on both sides of plant 102. The catching surface formed by brushes 106 is thus interrupted by holes 110. Fruit can thereby fall through holes 110 onto the ground, after which is deemed lost.

An even bigger problem occurs with the brushes of FIG. 3 when a plant is not positioned precisely halfway between the two containers 105, as shown in parts C and D of the figure. These figures show that a stem or branch of a plant 102 which is not placed in the middle bends bristles 109 of the nearest container 105 to the side relatively close to the container 105, whereby a rather large hole 110 is created behind plant 102, as seen from this nearby container. Because plants 102 are not always precisely in a straight line, the situations of figure parts C and D are relatively common, whereby a relatively large proportion of the harvest is lost with the bristles of FIG. 3.

Figure 4:
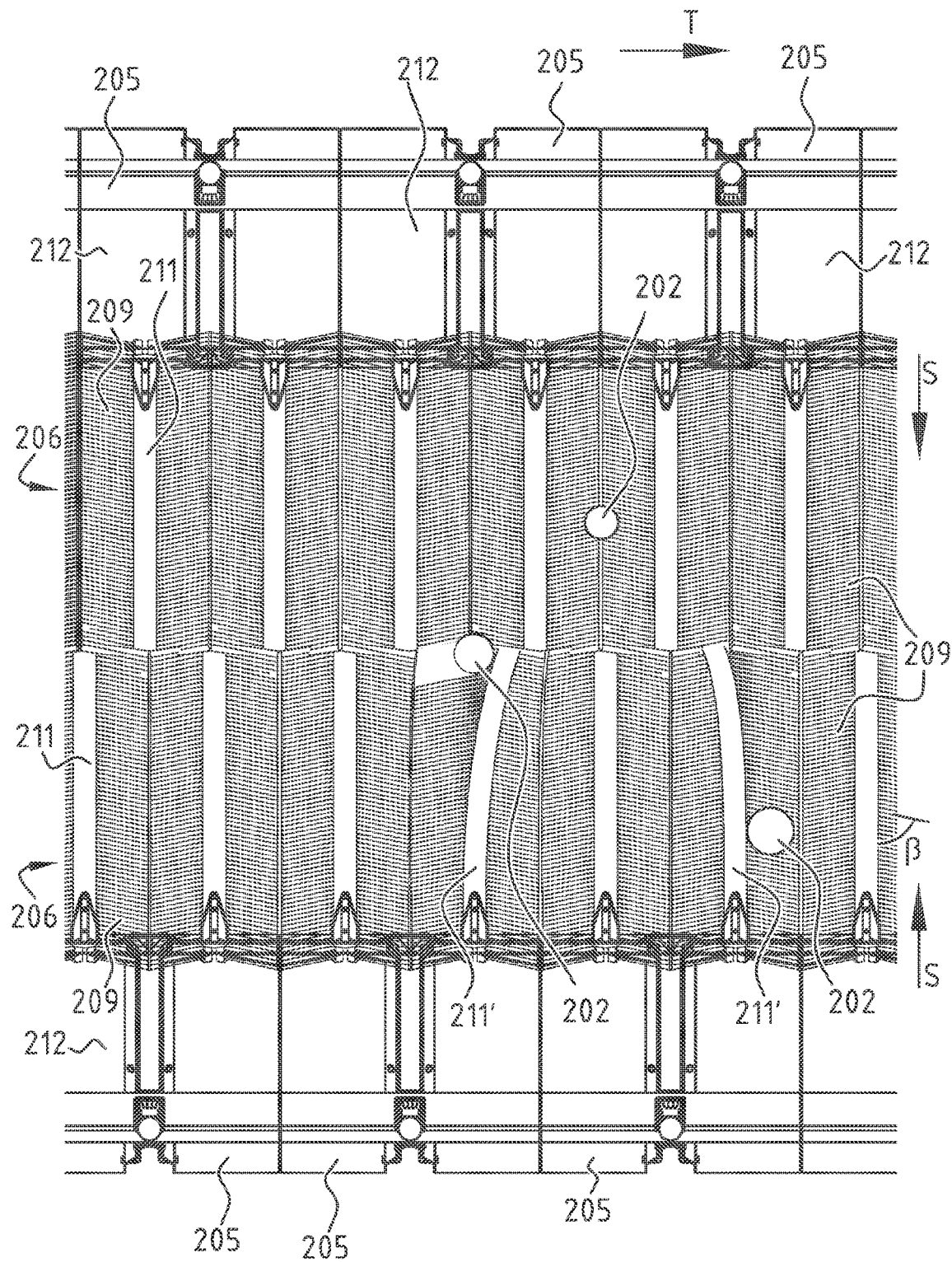
FIG. 4 shows schematically a top view of a number of containers with brushes mounted thereon according to an embodiment of the harvesting device according to the invention.

FIG. 4 shows brushes 206 which comprise according to the invention an arm 211 to which bristles 209 are attached. In the shown embodiment a plurality of containers 205 are shown, which extend in two rows parallel to transport direction T. The rows of containers 205 are removed from each other in direction of extension S. Containers 205 are displaceable relative to the frame in their direction of extension S and, unless indicated otherwise, operate in the same way as the containers of FIG. 3. Arms 211 extend substantially in the direction of extension S of their respective container 205. Arms 211 of containers 205 which are removed from each other in the direction of extension S are directed toward each other and at least almost touch each other's free end. For this purpose each arm 211 bridges about half of a minimal distance between two containers 205 removed from each other in direction of extension S.

Bristles 209 are attached to arm 211 and extend substantially parallel to transport direction T. No hole or a smaller hole is hereby created in the catching surface formed by bristles 206, even when a plant 202 is not positioned halfway between the containers 205. FIG. 4 further shows that bristles 209 extend from arm 211 in two directions, i.e. in the transport direction and counter to it. Each brush 206 is thereby two-sided. The free ends of bristles 209 of mutually adjacent arms touch each other at least almost, resulting in an at least substantially continuous catching surface of brushes 206. It is of course also possible to envisage giving brushes 206 a one-sided form and having the free ends of bristles 209 of a determined arm 211 at least almost touch an adjacent arm 211 so as to form an at least substantially closed catching surface.

In FIG. 4 an angle β is further defined between bristles 209 and arm 211 to which they are attached, on the side of the bristles 209 directed toward the container. As can be seen in the figure, the angle β is acute, i.e. greater than 0° but smaller than 90°. Bristles 209 thereby point back slightly to the container 205 on the arm 211 to which they are attached. In this way a brush 206 is co-displaced with bristles 209 when it is displaced toward a plant 202 in the direction of extension so that the bristles do not become caught behind obstacles, and no large holes are created. Because the arms 211 of brushes 206 of mutually opposite containers 205 are offset relative to each other in the transport direction T, the mutually opposite brushes 206 of those containers 205 have a substantially corresponding shape at their free end. This contributes to the formation of the at least substantially continuous catching surface.

Arms 211 take a flexible form so that they can bend slightly when a plant 202 is located at the position of an arm 211. This is shown in FIG. 4 with bent arms 211'. In this case the arms 211 are therefore manufactured from a plastic. Bristles 209 are in this case also manufactured from plastic.

Figure 5:
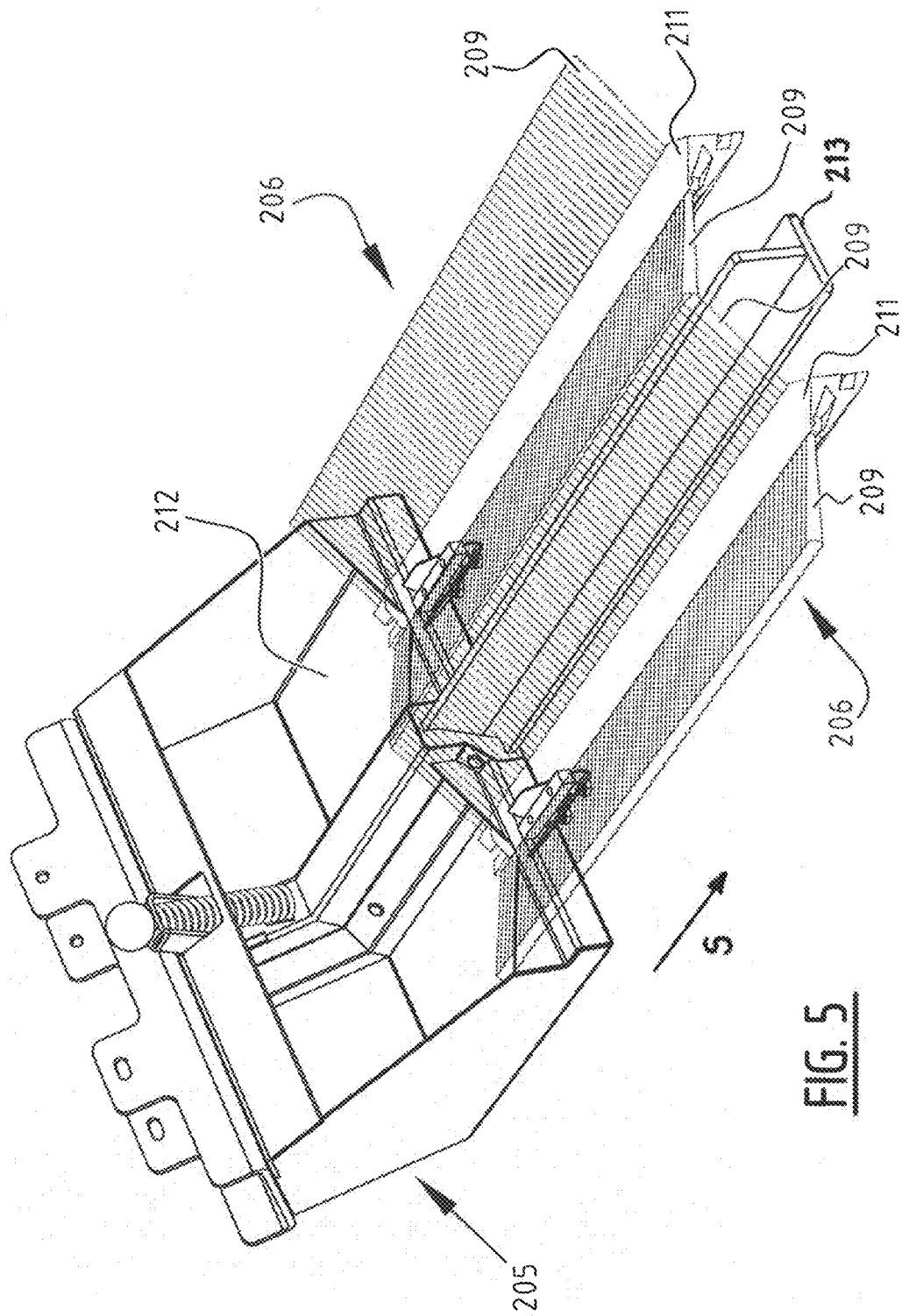
FIG. 5 shows schematically a perspective view of a single container with two brushes thereon of FIG. 4.

FIG. 5 shows a single container 205 of FIG. 4 in perspective view. De container 205 is mounted on a guide 213 which extends from the frame in the direction of extension S. Two brushes 206 are mounted on container 205, although any other number of brushes 206 per container can also be envisaged. It can be seen in this figure that a first part of bristles 209 is attached relative to the second part of bristles 209 at a non-straight angle α in a plane at right angles to a longitudinal direction of arm 211. Bristles 209 hereby form the legs of a V-shape, as seen in a cross-section at right angles to the longitudinal direction of arm 211, wherein arm 211 lies in the point of the V-shape. Each brush 206 hereby forms a gutter through which caught fruit can roll. Container 206 is mounted such that bristles 209 extend upward from arm 211 in normal use, whereby harvested fruit rolls toward the arm 211 of each brush due to the force of gravity. This prevents fruit falling between two mutually adjacent brushes 206.

Containers 205 further comprise catching bins 212. Brushes 206 are arranged in line with catching bins 212, and end in catching bins 212. Fruit can thereby roll from brush 206 of a determined container 205 into the catching bin 212 thereof. From catching bin 212, the fruit is generally unloaded into a collecting crate 13 (see FIG. 1). The harvesting device 1 according to the invention provides storage space for a plurality of collecting crates 13, which can be stacked and stored, optionally filled with fruit, until they are removed from harvesting device 1.

FIG. 6 shows a single container 305 according to another embodiment. This container 305 has the same features as described above and can thus be applied in the same way. The container 305 of FIG. 6 however differs from the above described containers in that this container 305 does not have bristles, but a flexible strip 316 to replace the bristles. In this case container 305 has one arm 311, but it can also have a plurality thereof. Arranged on either side of the arm is a flexible strip 316 lying alongside arm 311 in the longitudinal direction of arm 311. Flexible strips 316 extend from arm 311 in a direction substantially transversely of arm 311, i.e. away from arm 311, so that they extend from arm 311 in and counter to transport direction T when used in the above described harvesting device.

Figure 7A:
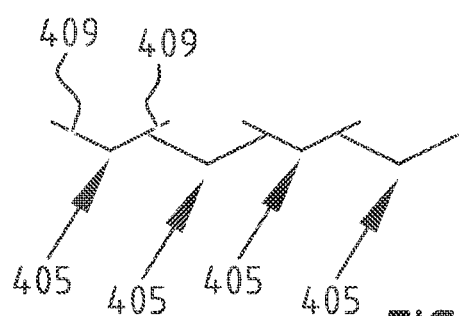
FIGS. 7a and 7b shows schematically a section of a number of containers placed adjacently of each other and overlapping each other as according to another embodiment.
Figure 7B:
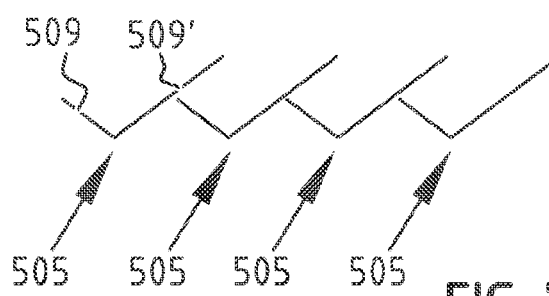

FIGS. 7A and 7B show in greatly simplified manner that mutually adjacent containers 405, 505 can at least partially overlap each other. FIG. 7A shows substantially identical containers 405 with bristles 409 which define a gutter, as described above. The bristles 409 could here of course also be replaced with a flexible strip. Containers 409 are offset relative to each other in the height direction, so that the free ends of mutually facing bristles 409 lie just above each other. This results in a relatively small area in which bristles 409 overlap each other. FIG. 7B also shows identical containers 505, which are however arranged at the same height. The bristles on one side (see 509') of the arms are always longer than those (see 509) of the other side, so that bristles 509' of the one side end above the bristles 509 on another side of an adjacent arm, and at least partially overlap them. Bristles 509, 509' can here also be replaced with flexible strips.

Figure 8:
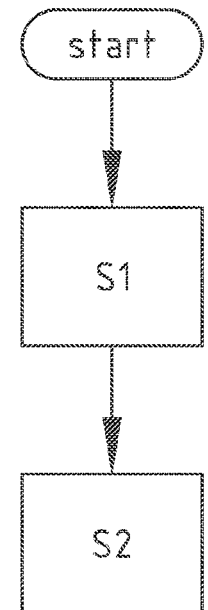
FIG. 8 shows a flow diagram of an embodiment of the method according to the invention.
Figure 8:
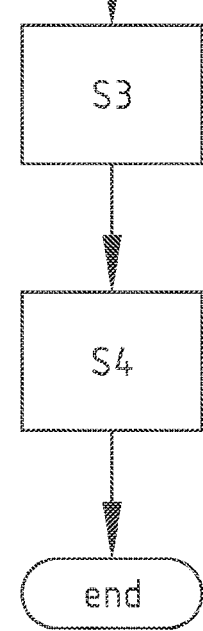

FIG. 8 shows an embodiment of the method 99 according to the invention by means of a flow diagram. Upon commencement, method 99 comprises of a first step S1 of displacing a harvesting device according to the invention toward at least one plant in a transport direction. This is followed by a second step S2 of displacing the at least one container toward the at least one plant in the direction of extension, such that the bristles form a catching surface at least partially around the at least one plant. The first step S1 and second step S2 can be performed simultaneously. Following second step S2 is a third step S4 of shaking the at least one plant so that fruit hanging therefrom falls onto the catching surface, or of picking and dropping fruit. As explained above, this can be done both mechanically and manually. A final, fourth step S4 of collecting the fruit caught by the catching surface follows to complete the method. This can for instance be done by providing the containers with catching bins, as explained above, and then pouring the fruit into collecting crates.

The invention is not limited to the embodiments described above or shown in the figures, but also extends to that defined in the claims which now follow.

The invention claimed is:

1. A harvesting device for harvesting fruit hanging from a plant, comprising:
    a frame displaceable in a transport direction;
    at least one container displaceably mounted on a guide which extends from the frame in a direction of extension substantially transversely of the transport direction; and
    at least one catcher mounted on the at least one container, wherein the at least one catcher comprises:

an arm extending substantially in the direction of extension from the container; and at least one flexible catching element attached to the arm and extending substantially parallel to the transport direction from the arm.

2. The harvesting device according to claim 1, wherein the at least one flexible catching element is formed by a flexible strip.

3. The harvesting device according to claim 1, wherein the at least one flexible catching element is formed by a number of bristles, which are attached to the arm and extend substantially parallel to the transport direction.

4. The harvesting device according to claim 1, wherein a first flexible catching element extends from the arm substantially in the transport direction and a second flexible catching element extends substantially counter to the transport direction.

5. The harvesting device according to claim 4, wherein the first flexible catching element is attached relative to the second flexible catching element at a non-straight angle in a plane at right angles to a longitudinal direction of the arm.

6. The harvesting device according to claim 5, wherein the at least one catching element extends from the arm in a direction defined as upward in normal use of the harvesting device.

7. The harvesting device according to claim 4, wherein a free end of the first flexible catching element of a determined arm at least almost touches a free end of the second flexible catching element of an adjacent arm.

8. The harvesting device according to claim 1, wherein mutually adjacent catchers at least partially overlap each other.

9. The harvesting device according to claim 1, wherein the arm extends from the container in a direction defined as upward in normal use of the harvesting device.

10. The harvesting device according to claim 3, wherein the bristles are connected to the arm at an acute angle, wherein the acute angle is defined between the arm and the bristles attached thereto, on a side of the bristles directed toward the container.

11. The harvesting device according to claim 1, wherein the arm is flexible.

12. The harvesting device according to claim 3, wherein the arm and/or the catching elements are manufactured from a plastic.

13. The harvesting device according to claim 1, provided with at least two containers removed from each other in the direction of extension, wherein the arms of the catchers of the two containers removed from each other in the direction of extension are directed toward each other.

14. The harvesting device according to claim 13, wherein a minimal distance is defined between the at least two displaceable containers in the direction of extension, wherein each arm bridges about half of this minimal distance in the direction of extension.

15. The harvesting device according to claim 13, wherein the arms of the catchers of the two containers removed from each other in the direction of extension are offset relative to each other as seen in the transport direction.

16. A method for harvesting fruit hanging from a plant, comprising the steps of:

providing a harvesting device for harvesting fruit hanging from a plant, comprising: a frame displaceable in a transport direction; at least one container displaceably mounted on a guide which extends from the frame in a direction of extension substantially transversely of the transport direction; and at least one catcher mounted on the at least one container, wherein the at least one catcher comprises: an arm extending substantially in the direction of extension from the container, and at least one flexible catching element attached to the arm and extending substantially parallel to the transport direction from the arm;

displacing the harvesting device toward at least one plant in a transport direction;

displacing the at least one container toward the at least one plant in the direction of extension such that the at least one flexible catching element forms a catching surface at least partially around the at least one plant;

shaking the at least one plant so that the fruit hanging therefrom falls onto the catching surface, or picking and dropping fruit; and collecting the fruit caught by the catching surface.

17. The method according to claim 16, wherein the harvesting device is provided with at least two containers removed from each other in the direction of extension, wherein the arms of the catchers of the two containers removed from each other in the direction of extension are directed toward each other; and wherein the at least two containers are displaced toward the plant from opposite sides of the plant.

* * * * *